May 12, 1925.  1,537,212

H. I. WRIGLEY

HAND BRAKE WHEEL

Filed Nov. 28, 1924

Inventor:
Henry I. Wrigley
By Gillson Mann & Cox
Attys.

Patented May 12, 1925.

1,537,212

UNITED STATES PATENT OFFICE.

HENRY I. WRIGLEY, OF CHICAGO, ILLINOIS, ASSIGNOR TO UNIVERSAL DRAFT GEAR ATTACHMENT CO., A CORPORATION OF ILLINOIS.

HAND-BRAKE WHEEL.

Application filed November 28, 1924. Serial No. 752,534.

*To all whom it may concern:*

Be it known that I, HENRY I. WRIGLEY, a citizen of the United States, and resident of Chicago, county of Cook, and State of Illinois, have invented certain new and useful Improvements in Hand-Brake Wheels, of which the following is a specification, and which are illustrated in the accompanying drawings, forming a part thereof.

For a long time hand brakes have not afforded sufficient power to apply the brakes with the pressure required for cars of the weight in general use and brakemen have increased the leverage of the brake wheel to make up the deficiency by a club inserted through the wheel and fulcrumed against the brake shaft. Recently a large number of cars have been equipped with multiplying levers, or other multiplying devices for giving the necessary braking pressure when the normal force was applied to the brake wheel. Increasing the leverage by the use of a club in these devices overstrains the hand brake and puts more pressure on the brake shoes than is consistent with good practice. When a car is equipped with the recent multiplying device, or mixed with other cars, and the brakeman uses his club in applying his brakes on all the cars, the result is a radical lack of uniformity in braking, which is not only objectionable, but sometimes dangerous. In braking several cars that are not connected with the locomotive the brakeman will sometimes use his club on a car equipped with a multiplying device, lock the wheels and make it check or stop the entire train. The object of the present invention is to prevent braking from increasing the leverage of the hand wheel by the above described use of the club.

One way of accomplishing this object is illustrated in the accompanying drawings, in which Fig. 1 is a plan view of an A. R. A. brake wheel made according to this invention;

Figure 3:
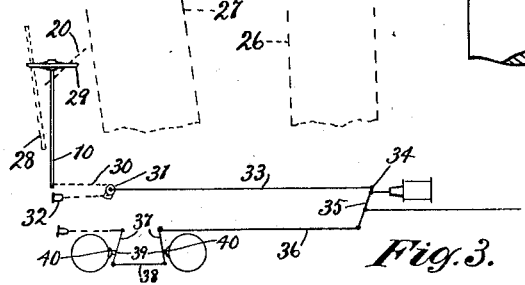
Fig. 3 is a diagrammatical view of a brake mechanism equipped with such a wheel.

In the illustrated diagram shown in Fig. 3 the hand brake includes a brake shaft 10 equipped with a brake wheel 29 at its upper end and in winding engagement with the brake chain 30 at its lower end. This chain cooperates with the multiplying lever in the form of a sheave 31 and has its other end anchored to the car at 32. The sheave 31 is operatively connected with the brake rod 33 which, in turn, is connected with the foundation brake gear at 34. The foundation brake gear includes the cylinder lever 35, the cylinder lever and brake lever connections 36, the brake levers 37, the brake lever strut 38, the brake beams 39, carrying brake shoes 40.

The brake shaft 10 is usually tapered, as indicated at 11 to receive the hub 12 of the hand brake wheel, which is secured thereon by a nut 13 that is, in turn, locked by a key 14. To insure joint rotation of the shaft and wheel a suitable key 15 is inserted in complimentary grooves in the tapered surfaces.

The hub is cast integral with the rim 16 and spokes 17. The rim is usually somewhat semi-cylindrical in shape, as shown best at 18 in Fig. 2, and is provided with drains 19 to permit the escape of water and the like.

Figure 1:
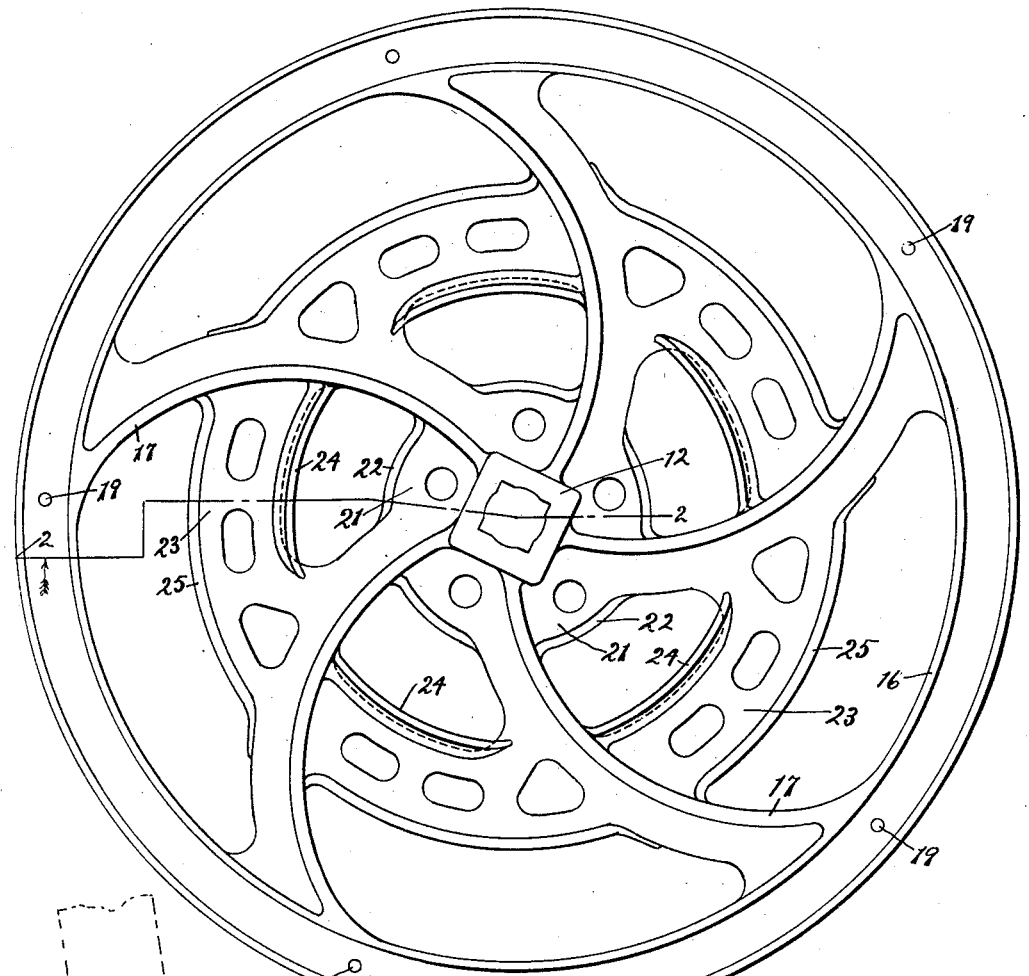
Figure 2:
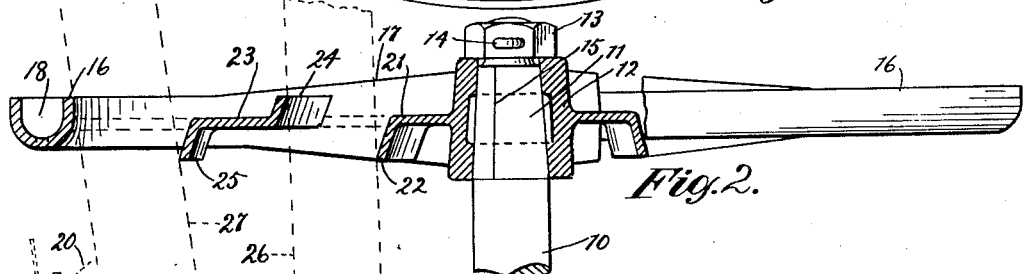
Fig. 2 is a sectional view of such a wheel and a portion of a brake shaft.

With such a wheel on the brake shaft there is ample room between the spokes and rim to permit a brakeman's club 20 to be inserted, as indicated in dotted lines in Fig. 3, and fulcrumed against the shaft. According to the present invention this space is broken by bars into such narrow portions that a club cannot be gotten into a position to give any increase of leverage. As shown, the web 21 connecting the spokes adjacent to the hub is provided with a flange 22, inclined downwardly and outwardly, as indicated in Fig. 2. In addition, substantially Z-shaped bars connect adjacent spokes about half way between the flanges 22 and the rim. These are composed preferably of webs 23, each having an upwardly and inwardly inclined flange 24 at its inner edge and a downwardly and outwardly inclined flange 25 at its outer edge, as shown particularly well in Fig. 2.

With such a construction the open spaces are so narrow that the brakeman's club can only assume the position such as indicated in dotted lines 26 and 27, Fig. 2, and 28 in Fig. 3, and hence no mechanical advantage can be gained by the use of a club. Consequently, when the brakeman comes to a car equipped with such a wheel he applies the brakes as it was intended by the designer that they should be applied, with the result that the hand brake is not strained nor the wheels locked and skidded.

Use has been made of specific description and illustration in order to disclose the invention, but it is intended that nothing contained herein shall unnecessarily limit the following claims, or require a construction thereof that would permit the substance of the invention to be used without infringement.

I claim as my invention:

1. In a brake mechanism, a brake shaft and a brake wheel having a hub mounted on the shaft, a rim, spokes connecting the hub and the rim, and means dividing the spaces between the spokes into such narrow portions as to prevent the brakeman's club from being inserted through the wheel and into engagement with the shaft.

2. In a brake mechanism, a brake shaft and a brake wheel having a hub mounted on the shaft, a rim, spokes connecting the hub and the rim, and bars connecting adjacent spokes and having portions extending laterally with respect to the wheels to prevent a brakeman's club from extending through the wheel and engaging with the shaft.

3. In a brake mechanism, a brake shaft and a brake wheel having a hub mounted on the shaft, a rim, spokes connecting the hub and the rim, and bars connecting adjacent spokes and having oppositely extending flanges on their inner and outer edges.

4. In a brake mechanism, a brake shaft and a brake wheel having a hub mounted on the shaft, a rim, spokes connecting the hub and the rim, bars connecting adjacent spokes near the hub and other bars connecting adjacent spokes between the first bars and the rim.

5. In a brake mechanism, a brake shaft and a brake wheel having a hub mounted on the shaft, a rim, spokes connecting the hub and the rim, webs connecting adjacent spokes near the hub, flanges extending downwardly from said webs, other webs connecting the spokes between the first webs and the rim, and flanges extending downwardly and upwardly from the inner and outer edges respectively of the last mentioned webs.

6. In a brake mechanism, a brake shaft and a brake wheel having a hub mounted on the shaft, a rim, spokes connecting the hub and the rim, a hand brake wheel comprising a hub, a rim and spokes connecting the hub and rim, bars connecting the spokes between the hub and rim and including flanges extending laterally with respect to the wheel and oppositely with respect to each other.

In testimony whereof I affix my signature

HENRY I. WRIGLEY.